(12) United States Patent
Zhou et al.

(10) Patent No.: US 8,040,697 B2
(45) Date of Patent: Oct. 18, 2011

(54) RESONANT CIRCUIT AND RESONANT POWER CONVERTER WITH A NARROW OPERATING FREQUENCY BANDWIDTH

(75) Inventors: Jun Zhou, Hangzhou (CN); Xiao-Lin Ma, Hangzhou (CN); Bing Guo, Hangzhou (CN)

(73) Assignee: Acbel Polytech Inc., Tamshui Chen, Taipei Hsien (TW)

( * ) Notice: Subject to any disclaimer, the term of this patent is extended or adjusted under 35 U.S.C. 154(b) by 300 days.

(21) Appl. No.: 12/403,254

(22) Filed: Mar. 12, 2009

(65) Prior Publication Data
US 2009/0290383 A1    Nov. 26, 2009

(30) Foreign Application Priority Data

May 22, 2008   (TW) ................................ 97118832 A

(51) Int. Cl.
*H02M 3/335*   (2006.01)

(52) U.S. Cl. ...................................... 363/21.02; 363/17
(58) Field of Classification Search .................... 363/17, 363/21.02, 21.03, 97, 131
See application file for complete search history.

(56) References Cited

U.S. PATENT DOCUMENTS 7,286,373 B1 * 10/2007 Liu et al. ........................ 363/16
* cited by examiner

*Primary Examiner* — Gary L Laxton
(74) *Attorney, Agent, or Firm* — patenttm.us

(57) ABSTRACT

A resonant circuit has two parallel resonant branches and one assistant inductor connecting the two resonant branches. Each resonant branch has a series capacitor and a series inductor connected in series. The other end of the series inductor is for connecting to a primary side of a transformer unit. The resonant circuit can provide two characteristic resonant frequencies fr and fm, so that a resonant power converter using the resonant circuit has an operating frequency fs that satisfies fs>fr or fm<fs<fr. The combination of the two resonant branches and the assistant inductor can reduce the frequency switch range of the resonant power converter within a specific voltage gain.

18 Claims, 18 Drawing Sheets

RESONANT CIRCUIT AND RESONANT POWER CONVERTER WITH A NARROW OPERATING FREQUENCY BANDWIDTH

BACKGROUND OF THE INVENTION

1. Field of the Invention

The invention relates to a resonant circuit and, in particular, to a resonant circuit used in a power converter.

2. Description of Related Art

With reference to FIG. 24, the U.S. Pat. No. 6,344,979, entitled "LLC series resonant DC-to-DC converter" has disclosed a LLC resonant power converter. The power converter mainly includes a square wave generator 100, a transformer 110, a resonant unit 120, a rectifying unit 130 and a filtering unit 140. The resonant unit 120 is connected between the primary side of the transformer 110 and the output terminal of the square wave generator 100. The rectifying unit is connected to the secondary side of the transformer 110. The filtering unit 140 is connected to the output terminal of the rectifying unit 130 for connecting to a load 150.

The resonant unit 120 has a series capacitor Cr connected with a series inductor Ls in series. Both the series capacitor Cr and the series inductor Ls are further connected with an inductor Lm provided by the transformer 110 in parallel. A first characteristic resonant frequency fr of the resonant unit 120 is determined by the series capacitor Cr and the series inductor Ls together. A second characteristic resonant frequency fm is determined by the series capacitor Cr, the series inductor Ls, and the inductor Lm altogether.

With reference to FIG. 25, the U.S. published application No. 2005/0207180 entitled "LLC half-bridge converter" discloses another resonant power converter. The power converter has a basic configuration and circuit operations being similar to the above-mentioned circuit. However, it can enhance the conversion efficiency of the converter. The transformer 110 provides two primary windings and two secondary windings. Two inductors Lm1 and Lm2 provided by the two primary windings are connected in series, whereas the two secondary windings are connected in parallel.

Either of the above-mentioned circuits uses the LLC resonant design. An obvious drawback of the LLC circuit is that the resonant power converter has to be operated in a wider operating frequency bandwidth in order to adjust its output voltage. Only by this can the circuit provide a stable operating voltage in a range to a load. In cases where a wider operating frequency bandwidth is impossible, it will be difficult for the LLC resonant design to effectively make the conversion or it simply reduces its conversion efficiency.

SUMMARY OF THE INVENTION

An objective of the invention is to provide a resonant circuit with a narrow operating frequency bandwidth suitable for a power converting device. The resonant circuit ensures normal operating functions for the power converting device in a narrower operating frequency bandwidth so as to provide a stable voltage output.

To achieve the above-mentioned objective, the resonant circuit includes:

a first resonant branch and a second resonant branch connected in parallel, each of which comprises:

a series capacitor; and a series inductor connected in series with the series capacitor and having one end for connecting to a primary coil of a transforming unit, the primary coil of the transforming unit being equivalent to a magnetizing inductor in parallel with a winding; and an assistant inductor having a first end connected to a connecting node between the series inductor of the first resonant branch and the primary side of the transforming unit; and a second end connected to another connecting node between the series inductor of the second resonant branch and the primary side of the transforming unit.

The above-mentioned series capacitors and series inductor work together to provide a first characteristic resonant frequency fr. Moreover, the series capacitor, the series inductor, the magnetizing inductor, and the assistant inductor altogether function to provide a second characteristic frequency fm. In particular, when the resonant circuit is applied in a power converting device, the operating frequency fs thereof have two modes: fs>fr and fm<fs<fr. It can reduce the range of operating frequency fs of the power converting device.

Another objective of the invention is to provide a resonant power converter that has the resonant circuit with the structure of double resonant branches. The power converter can make power conversion normally in a smaller operating frequency bandwidth, providing its load with the required working voltage.

To achieve the above-mentioned objectives, the disclosed resonant power converter includes:

a square wave generator;

a transforming unit providing a primary side with two primary coils and a secondary side with two secondary coils;

a resonant circuit connected to the square wave generator and the primary side of the transforming unit and comprising a first resonant branch and a second resonant branch connected in parallel, with an assistant inductor connected between the first resonant branch and the second resonant branch;

a rectifying unit connected to the secondary side of the transforming unit and comprising two diodes; and a filtering unit connected to the rectifying unit to adapt to connect to a load.

Using the topological structure of the above-mentioned resonant circuit, the invention can generate two characteristic resonant frequencies fr and fm. When the operating frequency fs of the power converter satisfies one of the fs>fr and fm<fs<fr conditions, the power converter can provide a larger range of working voltage to the load at only a relatively smaller operating frequency bandwidth. It enhances the power conversion efficiency and reduces the loss.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
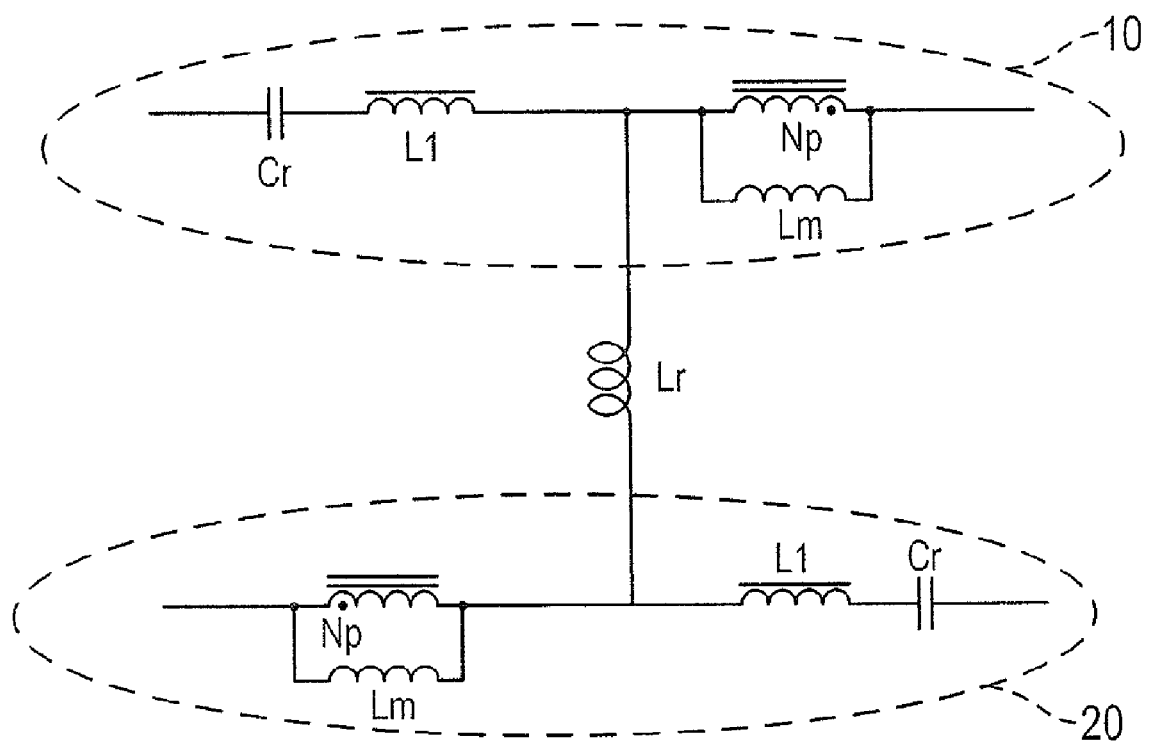
FIG. 1 is an equivalent circuit of a resonant circuit in accordance with the present invention.

With reference to FIG. 1, an equivalent circuit of an LLLC resonant circuit in accordance with the present invention comprises a first resonant branch 10, a second resonant branch 20 and an assistant inductor Lr.

The first resonant branch 10 has a series capacitor Cr connected to one end of a series inductor L1. The other end of the series inductor L1 is connected to a primary side of a transformer. The primary side of the transformer can be equivalently represented by a magnetizing inductor Lm and a winding Np connected in parallel.

The second resonant branch 20 is connected in parallel to the first resonant branch 10 and has a series capacitor Cr being connected to one end of another series inductor L1. The other end of the series inductor L1 is connected to a primary side of the transformer. The primary side of the transformer can be equivalently represented by a magnetizing inductor Lm and a winding Np connected in parallel.

The assistant inductor Lr is used to adjust the current. One end of the assistant inductor Lr is connected to a connecting node between the series inductor L1 of the first resonant branch 10 and the primary side of the transformer. The other end of the assistant inductor Lr is connected to another connecting node between the series inductor L1 of the second resonant branch 20 and the primary side of the transformer.

The series inductors L1 in the first resonant branch 10 and the second resonant branch 20 can be two independent inductors or two coils coupled by the same iron core. In addition to the magnetizing inductor Lm, both ends of the primary side can be connected with a physical inductor in parallel. The magnetizing inductor Lm and the physical inductor can be regard as being connected in parallel. Besides, the two magnetizing inductors Lm and the two primary windings Np can be provided by the primary windings of two independent transformers, or two independent windings twisted on the primary side of the same transformer. In this resonant circuit, the series capacitor Cr and the series inductor L1 work together to provide a first characteristic resonant frequency fr. The series capacitor Cr, the series inductor L1, the magnetizing inductor Lm and the assistant inductor Lr altogether provide a second characteristic resonant frequency fm.

Figure 2:
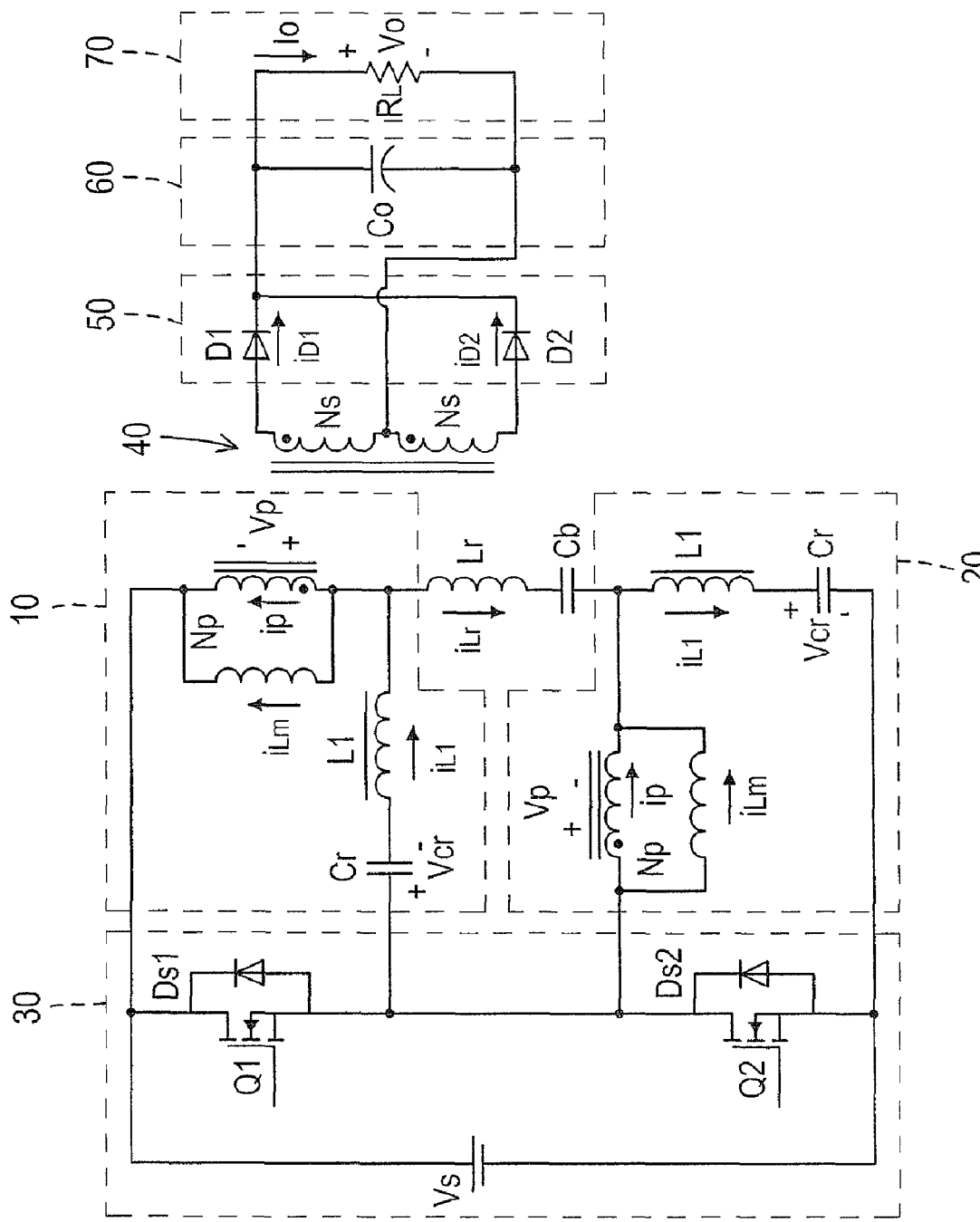
FIG. 2 is a circuit diagram of using the resonant circuit in a power converter in accordance with a first embodiment of the present invention.

With further reference to FIG. 2, the resonant circuit can be used in a DC/DC converter, thereby achieving a resonant power converter. The resonant power converter in this embodiment comprises a square wave generator 30, a transformer unit 40, a resonant circuit, a rectifying unit 50 and a filtering unit 60.

The square wave generator 30 consists of two switches Q1, Q2 being connected to a DC power supply Vs. Both ends of each switch Q1, Q2 have parasite diode Ds1, Ds2, respectively.

The transformer unit 40 provides two primary coils and two secondary coils. Each primary coil is equivalent to a magnetizing inductor and a primary winding Np. Likewise, each secondary coil is equivalent to at least one secondary winding Ns. The transformer unit 40 may consist of a single transformer or two independent transformers.

The resonant circuit is connected between the square wave generator 30 and the transformer unit 40 and comprises a first resonant branch 10, a second resonant branch 20 and an assistant inductor Lr. The assistant inductor Lr is further connected with a DC blocking capacitor Cb in order to block a direct current.

The rectifying unit 50 is connected to the secondary coils of the transformer unit 40 and consists of two diodes D1, D2.

The filtering unit 60 consists of a filtering capacitor Co connected between the output terminal of the rectifying unit 50 and a load 70.

The resonant power converter has two operating modes according to its operating frequency fs, i.e. fs>fr or fm<fs<fr. They are described in detail below.

I. fs>fr

Figure 3:
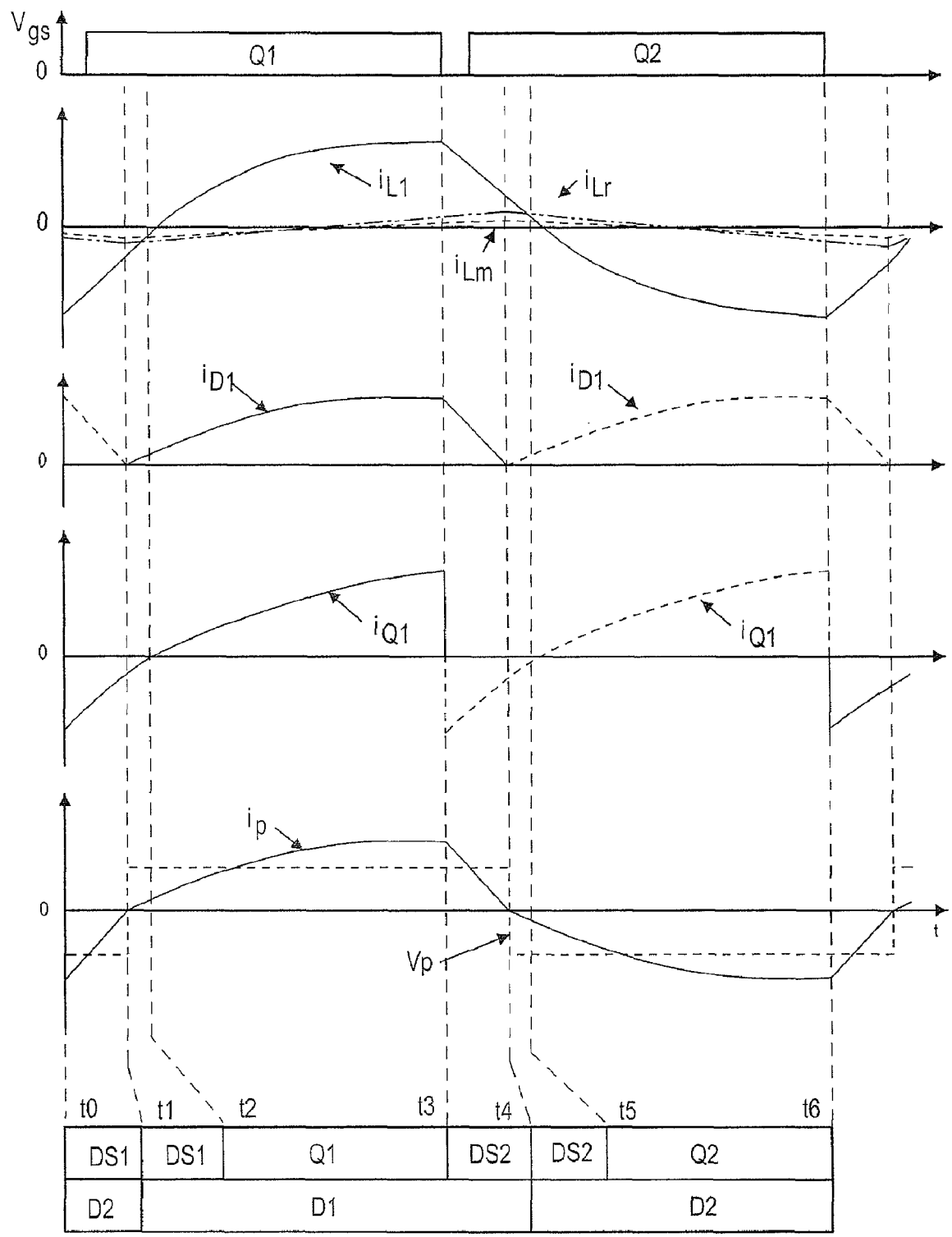
FIG. 3 is the waveform of the power converter in FIG. 2 in its first operating mode fs>fr.

When the operating frequency fs is higher than the first characteristic resonant frequency fr, the stable working process in one ON-OFF cycle can be divided into six stages A~F. The working waveform is shown in FIG. 3. The directions of the currents are defined in FIG. 2.

A. First Stage t0~t1

Figure 4:
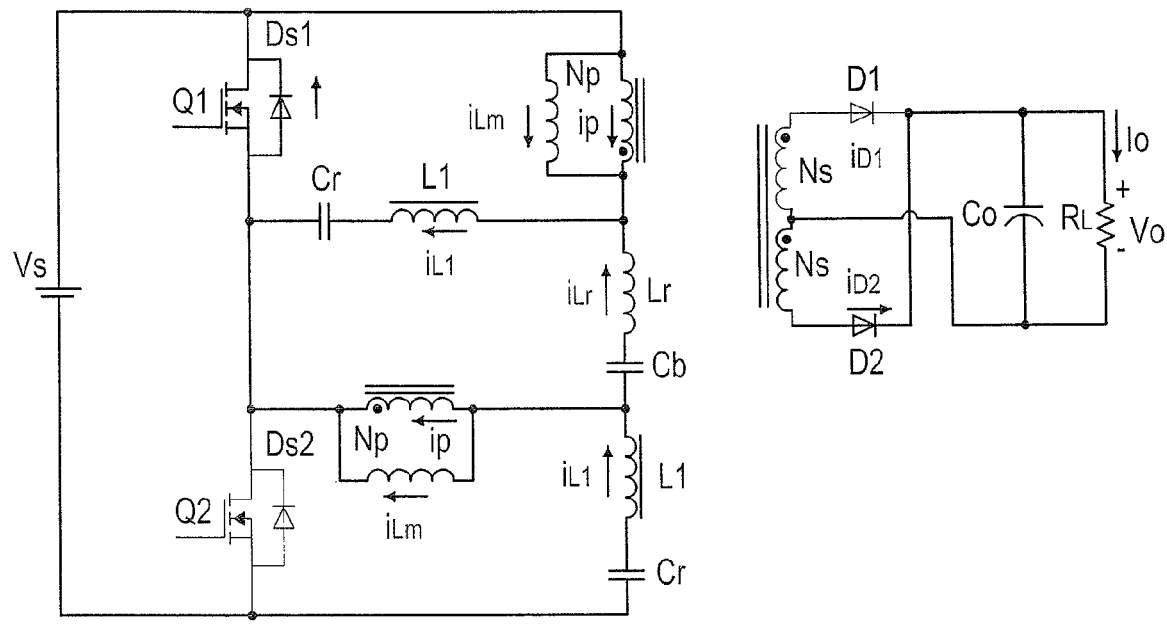
FIG. 4 shows the circuit operation during the first stage in the first operating mode.

With reference to FIG. 4, the second switch Q2 is conductive before t0. At t=t0, the second switch Q2 is turned off. Due to the existence of inductors, the current cannot change abruptly. Therefore, the primary side current continues to flow through the parasite diode Ds1 of the first switch Q1 (neglecting the charging/discharging process of the output capacitors of Q1 and Q2). The primary side current $i_P = i_{L1} -$ $i_{Lm}-i_{Lr}$ flowing through the transformer unit 40 is negative at the moment. The diode D2 in the rectifying unit 50 of the secondary side is still conductive. The primary side voltage Vp is clamped at −nVo. The currents $i_{Lm}$ and $i_{Lr}$ increase linearly in the negative direction. At the same time, a resonant current iL1 rapidly decreases in the negative direction. When t=t1, $i_{L1}=i_{Lm}+i_{Lr}$ and $i_P$ reduces to zero in the negative direction, the secondary side current also reduces to zero. The diode D2 becomes non-conductive.

B. Second Stage t1~t2

Figure 5:
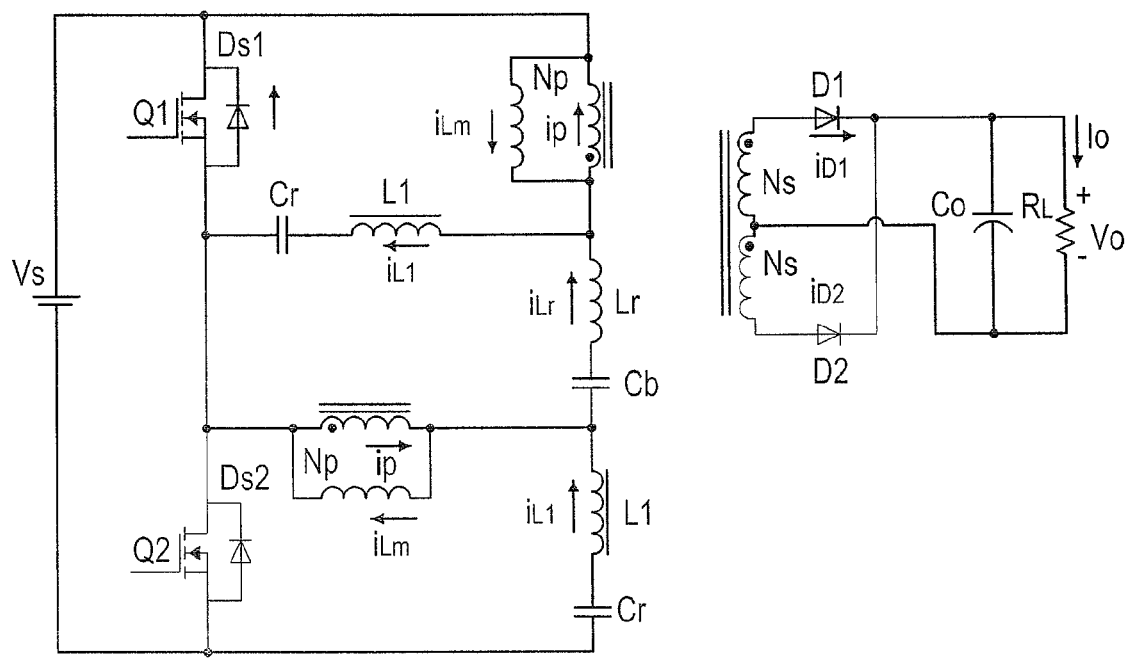
FIG. 5 shows the circuit operation during the second stage in the first operating mode.

With reference to FIG. 5, when t=t1 the current $i_P$ is zero and the diode D2 cuts off. Afterwards, because the resonant current $i_{L1}$ rapidly reduces in the negative direction (increases in the positive direction), the current $i_P$ is greater than zero ($i_P=i_{L1}-i_{Lm}-i_{Lr}$). Because of the transformer unit 40, the diode D1 is forced to be conductive. The primary side voltage Vp is clamped at nVo. The currents $i_{Lm}$ and $i_{Lr}$ start to linearly decrease in the negative direction (increase in the positive direction). The currents $i_{L1}$ and $i_{Q1}$ are negative. The current $i_{Q1}$ continues to pass through the parasite diode Ds1 of the first switch Q1. When t=t2 and the primary side current of the transformer unit 40 increases to $i_P=i_{Lm}+i_{Lr}/2$, the current flowing through the parasite diode Ds1 drops to zero. After the process is over, the driving signal of the first switch Q1 is output before t2, achieving zero voltage switching (ZVS).

C. Third Stage t2~t3

Figure 6:
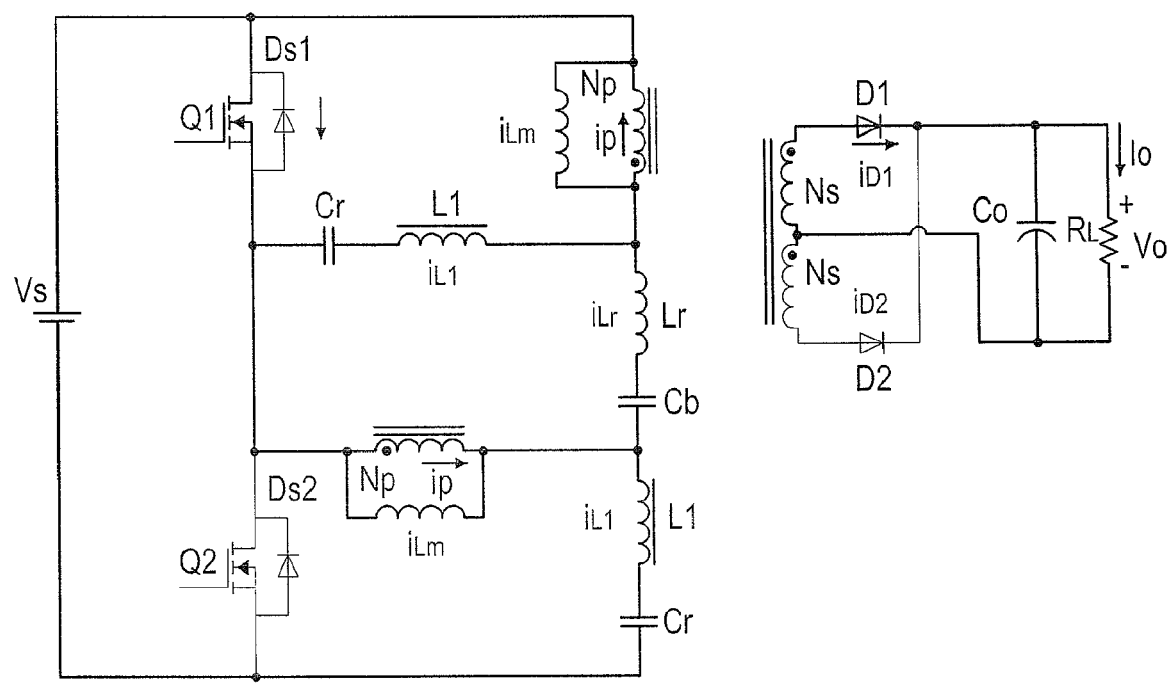
FIG. 6 shows the circuit operation during the third stage in the first operating mode.

With reference to FIG. 6, when t=t2, the first switch Q1 starts to have a positive current. The diode D1 remains conductive, the primary side voltage Vp is still clamped at nVo, and the currents $i_{Lm}$ and $i_{Lr}$ continue to increase linearly in the positive direction. When t=t3, the first switch Q1 turns off, and the process is over. During this process, the currents flowing through the magnetizing inductor Lm, the series inductor L1, and the assistant inductor Lr accomplish current reversal (from negative to positive).

D. Fourth Stage t3~t4

Figure 7:
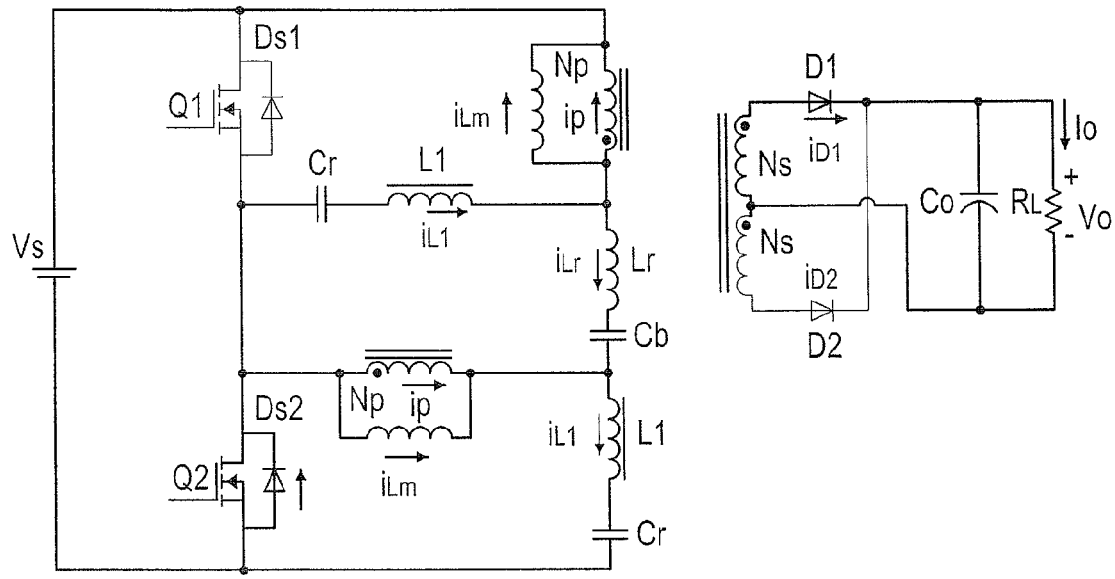
FIG. 7 shows the circuit operation during the fourth stage in the first operating mode.

With reference to FIG. 7, when t=t3, the first switch Q1 turns off. Due to the existence of the inductors, the current cannot change abruptly. Therefore, the primary side current continues to flow through the parasite diode Ds2 of the second switch Q2 (neglecting the charging/discharging process of the output capacitors of Q1 and Q2). The current flowing through the primary side of the transformer unit 40 $i_P=i_{L1}-i_{Lm}-i_{Lr}$ is positive at this moment. The diode D1 on the secondary side remains conductive. The primary side voltage Vp is clamped at nVo. The currents $i_{Lm}$ and $i_{Lr}$ linearly increase in the positive direction. The resonant current $i_{L1}$ decreases. When t=t4, $i_{L1}=i_{Lm}+i_{Lr}$ and $i_P=0$. Correspondingly, the secondary side current is also zero. The diode D1 cuts off.

E. Fifth Stage t4~t5

Figure 8:
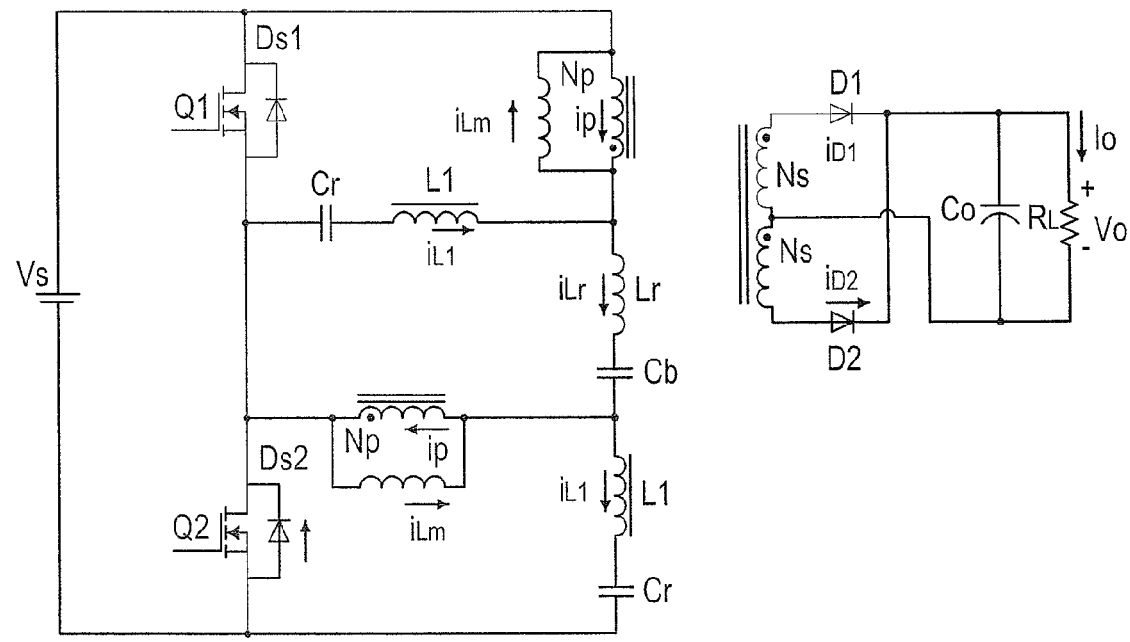
FIG. 8 shows the circuit operation during the fifth stage in the first operating mode.

With reference to FIG. 8, when t=t4, the current $i_P$ is zero and the diode D1 cuts off. Afterwards, the resonant current $i_{L1}$ continues to drop so that the current $i_P$ is smaller than zero ($i_P=i_{L1}-i_{Lm}-i_{Lr}$). Due to the transformer unit 40, the diode D2 becomes conductive. The primary voltage Vp is clamped at −nVo. The currents $i_{Lm}$ and $i_{Lr}$ start to reduce linearly. The resonant current $i_{L1}$ is positive. The current $i_{Q2}$ is negative and continues to flow through the parasite diode Ds2 of the second switch Q2. When t=t5 and the primary current rises in the negative direction to $i_P=i_{Lm}+i_{Lr}/2$, the current flowing through the parasite diode Ds2 drops to zero and the process is over. The driving signal of the second switch Q2 sends out before t5, accomplishing ZVS.

F. Sixth Stage t5~t6

Figure 9:
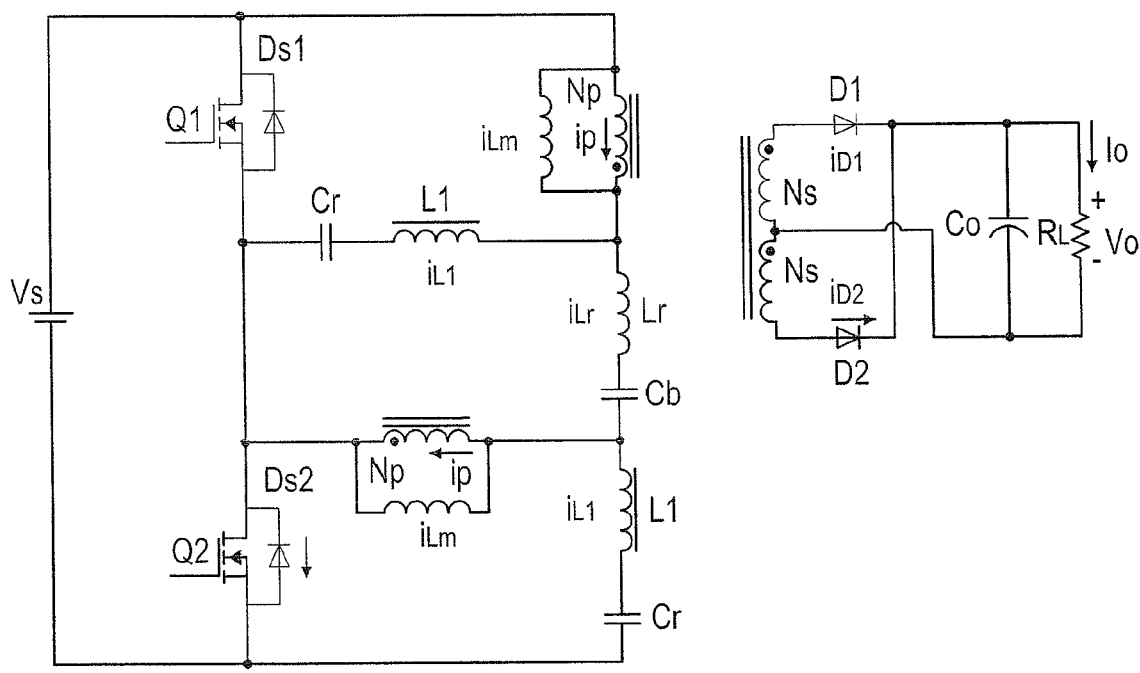
FIG. 9 shows the circuit operation during the sixth stage in the first operating mode.

With reference to FIG. 9, when t=t5 the second switch Q2 starts to have a positive current. The diode D2 remains conductive. The primary voltage Vp is clamped at −nVo, and the currents $i_{Lm}$ and $i_{Lr}$ increase linearly in the negative direction. When t=t6, the second switch Q2 cuts off and the process is over. During the process, the currents on the magnetizing inductor Lm, the series inductor L1, and the assistant inductor Lr accomplish current reversal (from positive to negative). Afterwards, the next work cycle starts.

II. fm<fs<fr

Figure 10:
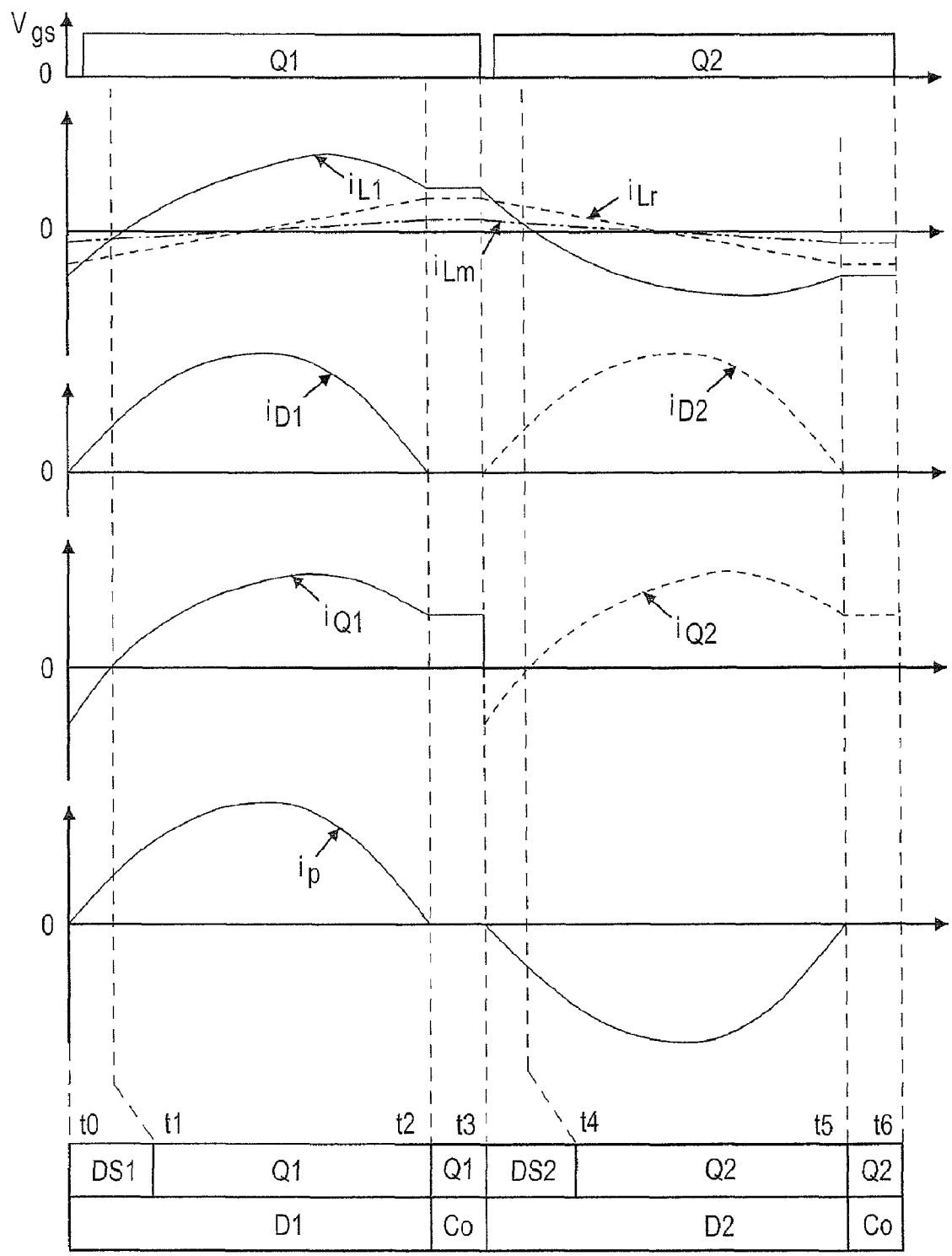
FIG. 10 shows the waveform of the power converter in FIG. 2 in its second operating mode fm<fs<fr.

Now consider the case when the operating frequency fs of the converter is between the two characteristic frequencies fm and fs. The stable operating process during one ON-OFF cycle can also be divided into six stages A~F. The working waveform is shown in FIG. 10. The direction of each current is defined in FIG. 2.

A. First Stage t0~t1

Figure 11:
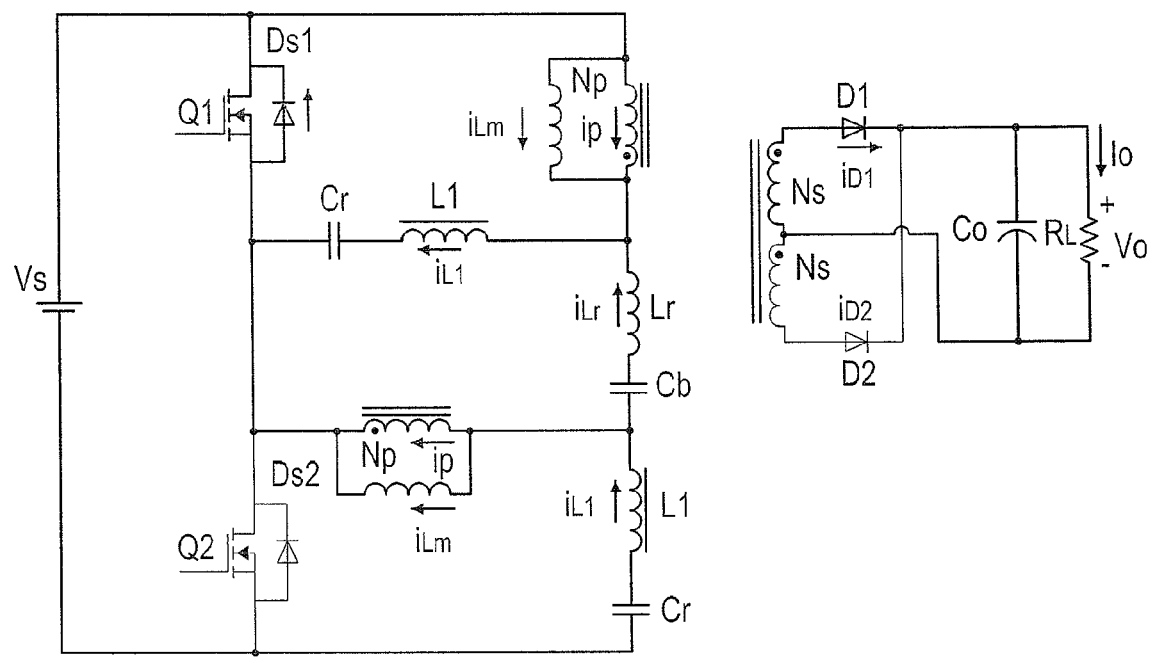
FIG. 11 shows the circuit operation during the first stage in the second operating mode.

With reference to FIG. 11, the second switch Q2 is conductive and working before t0. When t=t0, the second switch Q2 is controlled to cut off. Due to the existence of inductors, the current cannot change abruptly. The primary side current passes through the parasite diode Ds1 of the first switch Q1 and remains flowing (neglecting the charging/discharging process of the output capacitors of Q1 and Q2). The resonant current iL1 linearly reduces in the negative direction. The current $i_P$ flowing through the primary side of the transformer unit 40 changes from zero to positive. Due to the transformer unit 40, the diode D1 becomes conductive. The primary voltage Vp is clamped at nVo. The currents $i_{Lm}$ and $i_{Lr}$ reduces linearly in the negative direction (increase linearly in the positive direction). When t=t1 and the primary side current of the transformer unit 40 rises to $i_P=i_{Lm}+i_{Lr}/2$, the current flowing through the parasite diode Ds1 drops to zero and the process is over. The driving signal of the first switch Q1 sends out before t1, accomplishing ZVS.

B. Second Stage t1~t2

Figure 12:
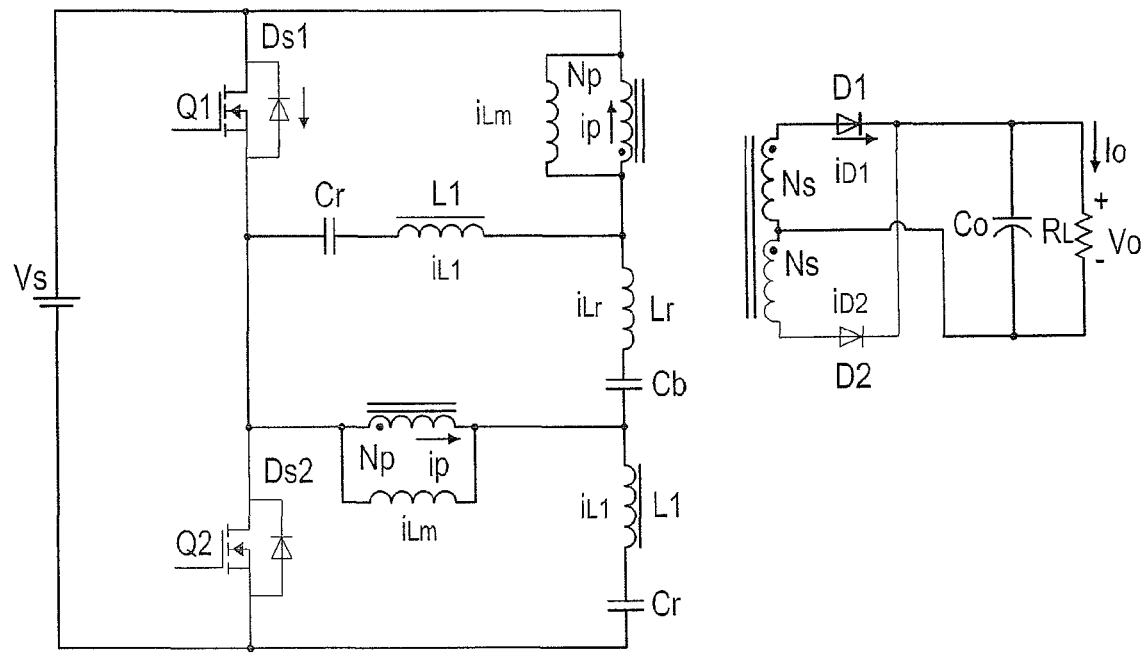
FIG. 12 shows the circuit operation during the second stage in the second operating mode.

With reference to FIG. 12, the first switch Q1 starts to have a positive current when t=t1. The diode D1 on the secondary side remains conductive. The primary voltage Vp is clamped at nVo. The currents $i_{Lm}$ and $i_{Lr}$ continues to increase linearly in the positive direction. When t=t2, the primary current $i_P$ of the transformer unit 40 oscillates harmonically to zero and the current through the diode D1 also drops to zero, achieving zero current switching (ZCS). During this process, the currents flowing through the magnetizing inductor Lm, the series inductor L1, and the assistant inductor Lr accomplish current reversal (from negative to positive).

C. Third Stage t2~t3

Figure 13:
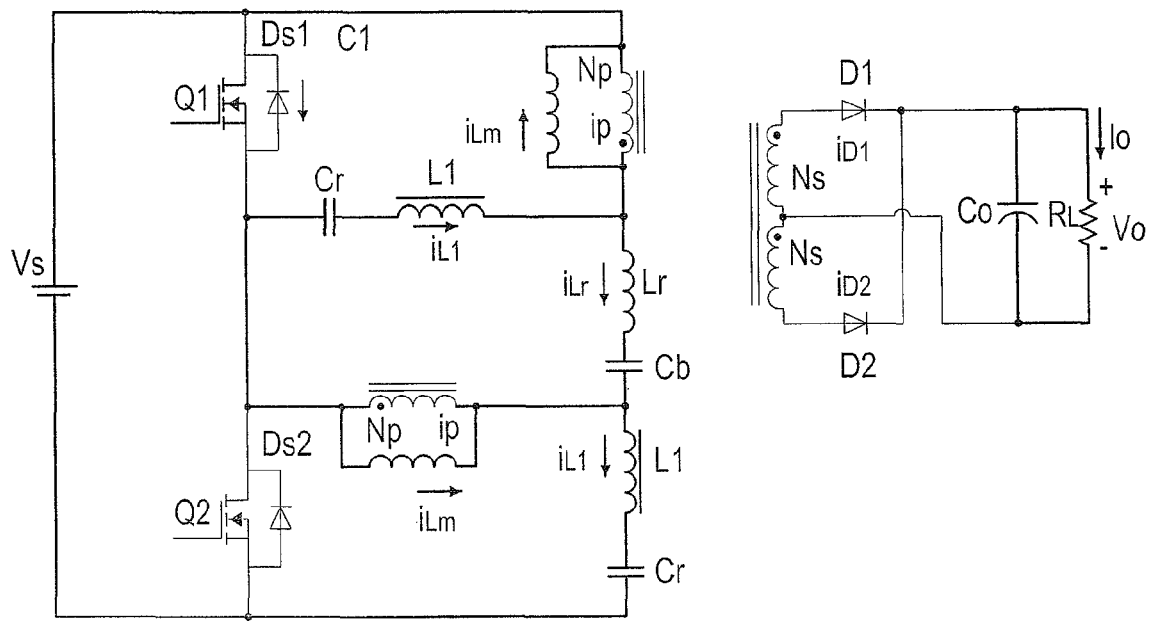
FIG. 13 shows the circuit operation during the third stage in the second operating mode.

With reference to FIG. 13, the primary current $i_P$ oscillates harmonically to zero when t=t2. At this moment, the diode D1 on the secondary side cuts off. The energy for the load is supplied completely by the filtering capacitor Co. In this case, $i_{L1}=i_{Lm}+i_{Lr}$. The current flowing through the first switch Q1 is $i_{Q1}=2_{iLm}+i_{Lr}$. At this moment, the magnetizing inductor Lm, the series inductor L1, the assistant inductor Lr, and the series capacitor Cr have resonance. Because the values of the magnetizing inductor Lm and the assistant inductor Lr are larger, the current $i_{Lm}$ and $i_{Lr}$ have smaller variations during this process.

D. Fourth Stage t3~t4

Figure 14:
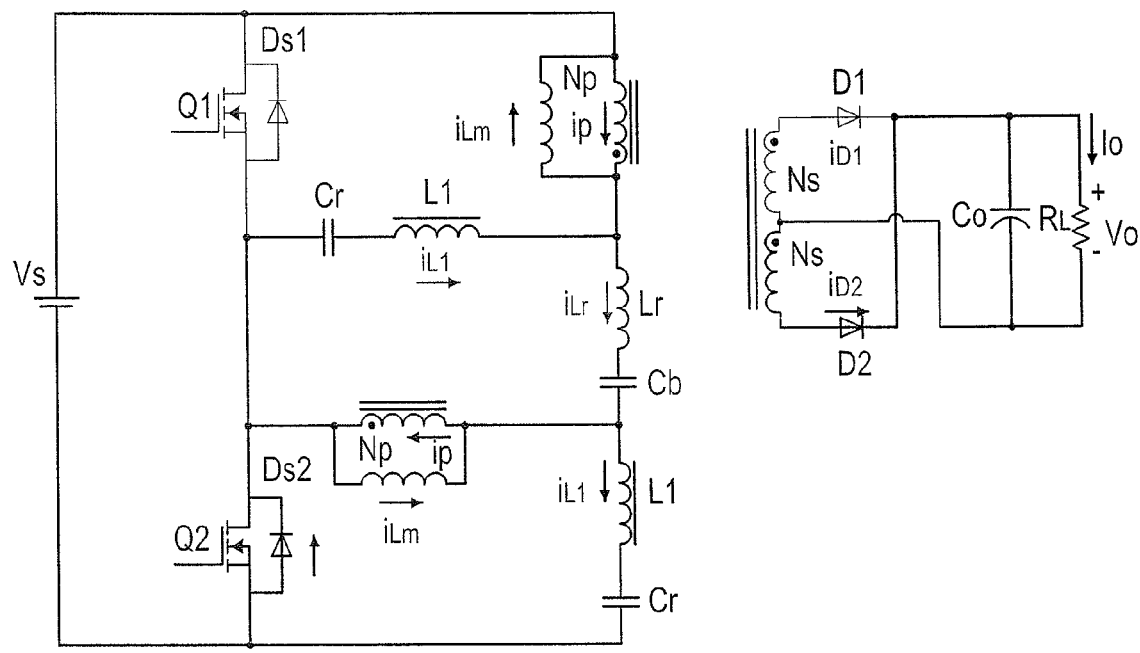
FIG. 14 shows the circuit operation during the fourth stage in the second operating mode.

With reference to FIG. 14, the first switch Q1 is controlled to cut off at t=t3. Due to the existence of inductors, the current cannot change abruptly. The primary current flows through the parasite diode Ds2 of the second switch Q2 and remains flowing (neglecting the charging/discharging process of the output capacitors of Q1 and Q2). The resonant current $i_{L1}$ reduces linearly in the positive direction. The primary current $i_P$ of the transformer unit 40 changes from zero to negative. Due to the transformer unit 40, the diode D2 on the secondary side is conductive. The primary voltage Vp is clamped at $-n \cdot V_o$. The currents $i_{Lm}$ and $i_{Lr}$ start to reduce linearly in the positive direction. When $t=t4$ and the primary current $i_P=i_{Lm}+i_{Lr}/2$, the current flowing through the parasite diode Ds2 drops to zero. The driving signal of the second switch Q2 sends out before t4, implementing ZVS.

E. Fifth Stage t4~t5

Figure 15:
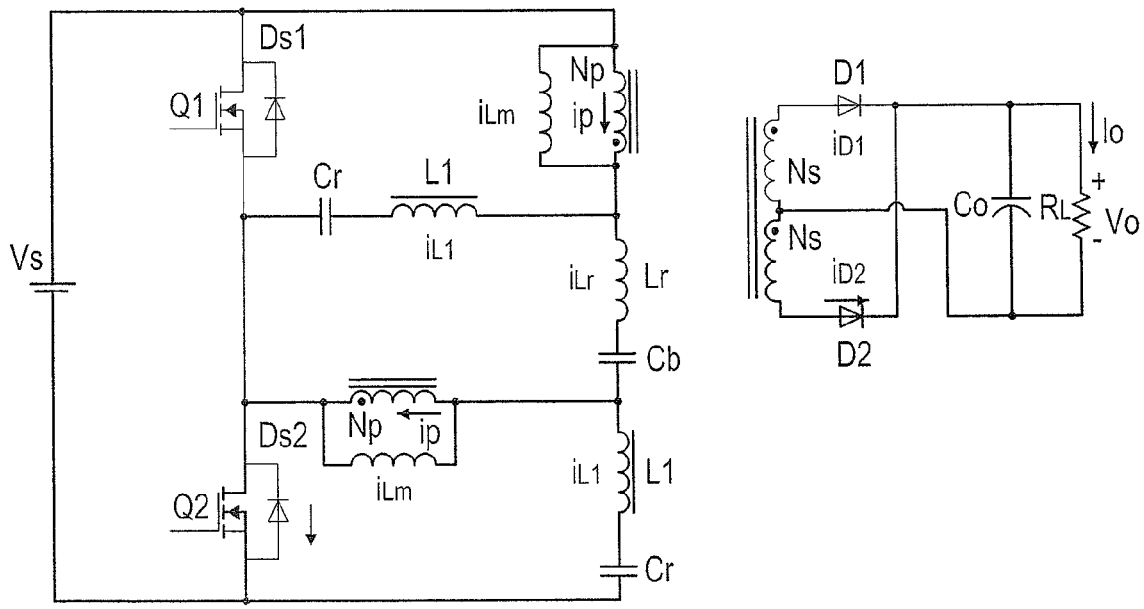
FIG. 15 shows the circuit operation during the fifth stage in the second operating mode.

With reference to FIG. 15, the second switch Q2 starts to have a positive current at $t=t4$. The diode D2 remains conductive. The primary voltage is clamped at $-n \cdot V_o$. The currents $i_{Lm}$ and $i_{Lr}$ increase linearly in the negative direction. When $t=t5$, the primary current $i_P$ oscillates harmonically to zero. The current flowing through the diode D2 also becomes zero, implementing ZCS. During this process, the currents flowing through the magnetizing inductor Lm, the series inductor L1, and the assistant inductor Lr accomplish current reversal (from positive to negative).

F. Sixth Stage t5~t6

Figure 16:
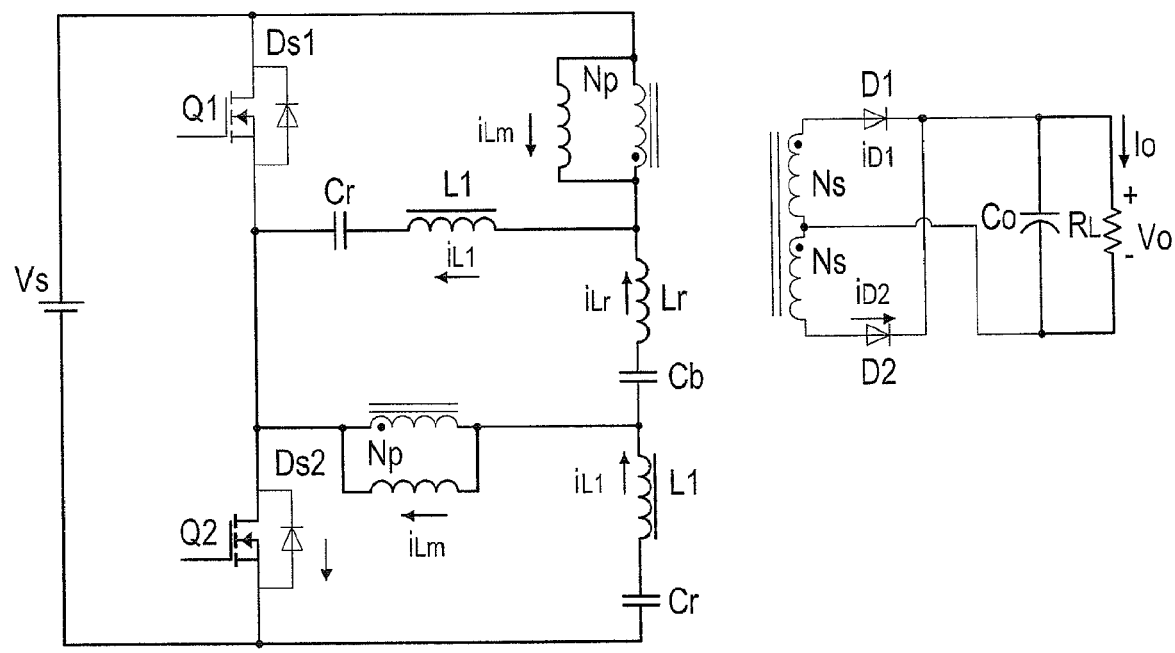
FIG. 16 shows the circuit operation during the sixth stage in the second operating mode.

With reference to FIG. 16, when $t=t5$, the primary current resonates to zero. The diode D2 on the secondary side cuts off, and energy for the load 70 is completely supplied by the filtering capacitor Co. In this case, $i_{L1}=i_{Lm}+i_{Lr}$ and the current flowing through the second switch Q2 is $i_{Q2}=2i_{Lm}+i_{Lr}$. The magnetizing inductor Lm, the series inductor L1, the assistant inductor Lr, and the series capacitor Cr have resonance. Because the values of the magnetizing inductor Lm and the assistant inductor Lr are larger, the currents $i_{Lm}$ and $i_{Lr}$ have smaller variations during this process. Afterwards, the next work cycle starts.

When fm<fs<fr, the power converter in accordance with the present invention functions like an LLC resonant circuit and nVo>Vin/2 (n being the ratio of turns in the transformer unit 40).

Figure 24:
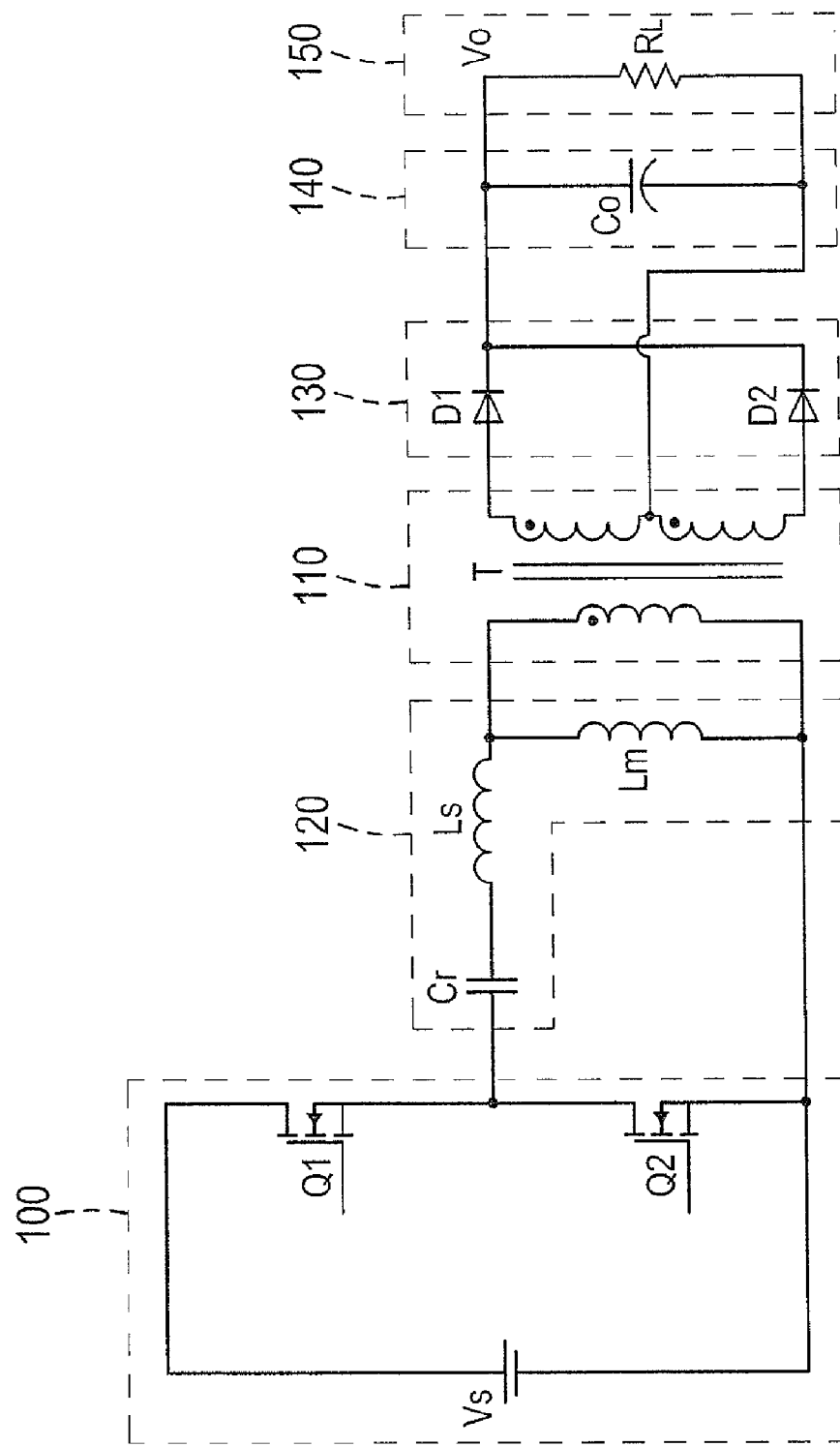
FIG. 24 is a circuit diagram of a conventional resonant power converter.
Figure 25:
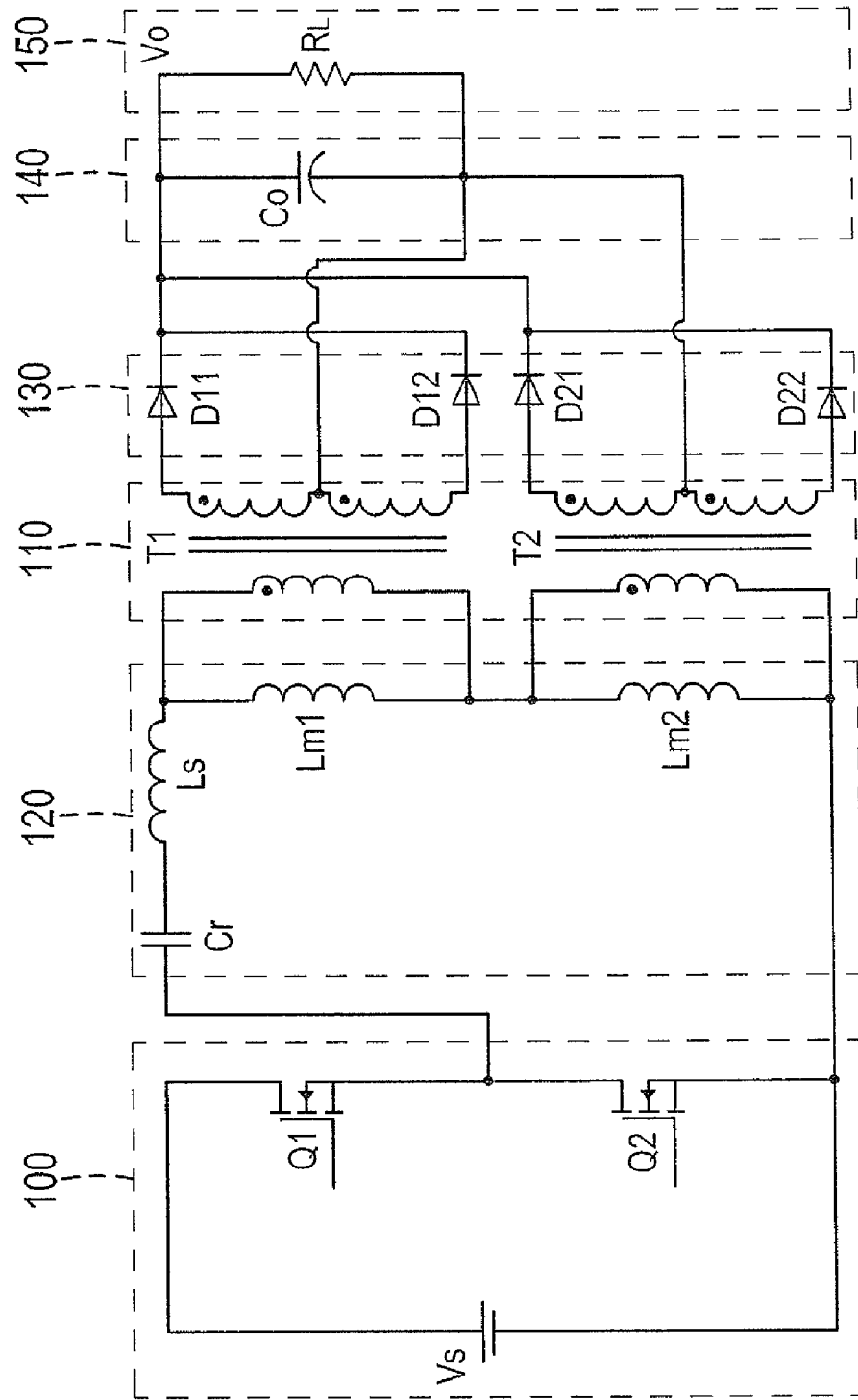
FIG. 25 is a circuit diagram of another conventional resonant power converter.

When the LLC converting circuit in the prior art, as shown in FIG. 24, has fm<fs<fr, the relationship between the input voltage and output voltage can be shown as following:

$$V_o = \frac{V_{in}}{2n} + \frac{I_{m\_LLC}}{4nC_{r\_LLC}}(T_s - T_r) \quad (1)$$

where $I_{m\_LLC}$ is a peak value of magnetizing current and is also used as a cutoff current for the MOS switch, $T_r$ is the period of the first harmonic frequency fr, and $T_s$ is the period of the operating frequency fs.

In comparison with the conventional converting circuit, when the LLLC converter in FIG. 1 is operated in the mode of fm<fs<fr, its input voltage Vin and output voltage Vo has the following relation:

$$V_o = \frac{V_{in}}{2n} + \frac{I_{m\_LLLC} + I_{Lr\_LLLC}}{4nC_{r\_LLLC}}(T_s - T_r) \quad (2)$$

where $I_{m\_LLLC}$ is a peak value of magnetizing current, $I_{Lr\_LLLC}$ is a peak value of current of the assistant inductor Lr, $T_r$ is the period of the first harmonic frequency fr, and $T_s$ is the period of the operating frequency fs.

In the present invention, the cutoff current for the MOS transistor being used as a switch is $2I_{m\_LLLC}+I_{Lr\_LLLC}$. Moreover, the current flowing through the series capacitor Cr is about half that through the series capacitor Cr in the prior art. When the sustaining voltages of them are the same, $C_{r\_LLC}=2C_{r\_LLLC}$.

Take the same cutoff current and sustaining voltage of the MOS transistors in the conventional LLC and the LLLC of the present invention to be the same. Eq. (1) can be rewritten as:

$$V_o = \frac{V_{in}}{2n} + \frac{I_{m\_LLLC} + \frac{1}{2}I_{Lr\_LLLC}}{4nC_{r\_LLLC}}(T_s - T_r) \quad (3)$$

A comparison between Eq. (2) and Eq. (3) shows that the LLLC has a larger voltage gain than the LLC. Therefore, within the same voltage gain, the LLLC has a narrower operating frequency bandwidth than the LLC.

An analysis of the foregoing operation process and waveform shows that the circuit operations of the invention is analogous to the LLC. The invention can completely implement ZVS of the switches Q1, Q2 and ZCS of the output rectifying elements. As a result, the disclosed power converter has high efficiency and low electromagnetic interference (EMI).

When the assistant inductor Lr is taken to infinity, it is equivalent to two LLC connected in parallel. When the series inductor Lm is taken to infinity, the assistant inductor Lr functions like the series inductor Lm. It enables the power converter to have an even narrower frequency bandwidth for a specific range of voltage gain.

The above analysis indicates that the invention is more suitable for situations that require a hold up time and higher converting efficiency.

Figure 17:
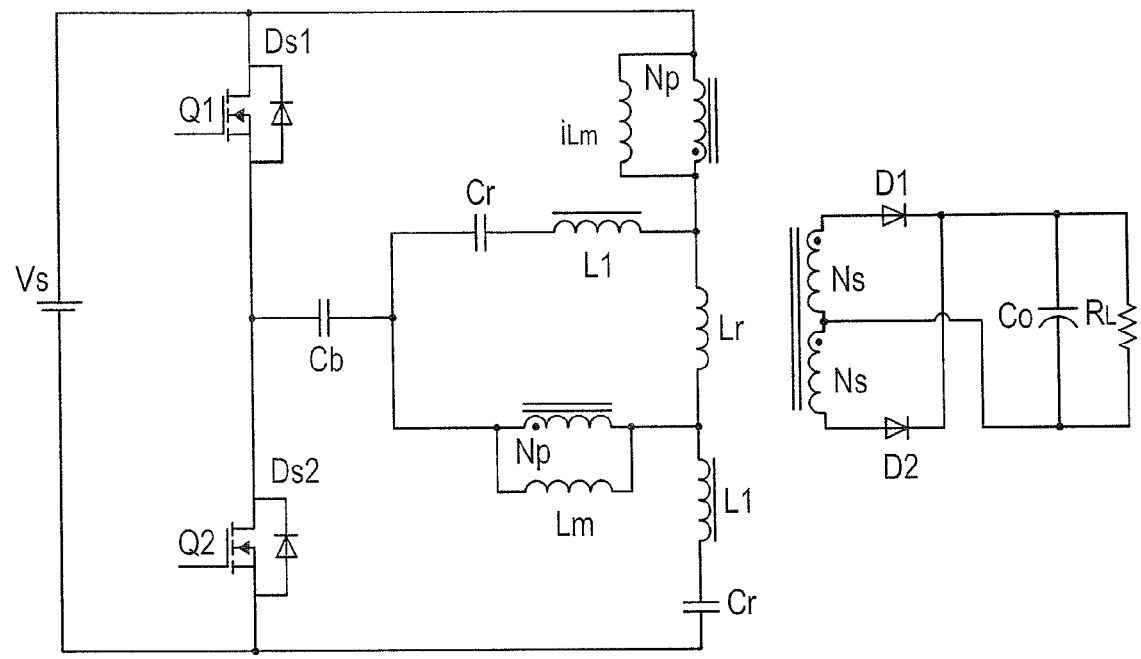
FIG. 17 is a circuit diagram of using the resonant circuit in a power converter in accordance with a second embodiment of the present invention.

The foregoing descriptions explain the first embodiment of the power converter. With reference to FIG. 17 for a second embodiment of the invention, the DC blocking capacitor Cb is connected between the square wave generator 30 and the two resonant branches 10, 20. At this position, the DC blocking capacitor Cb withstands the stress from the primary power current.

Figure 18:
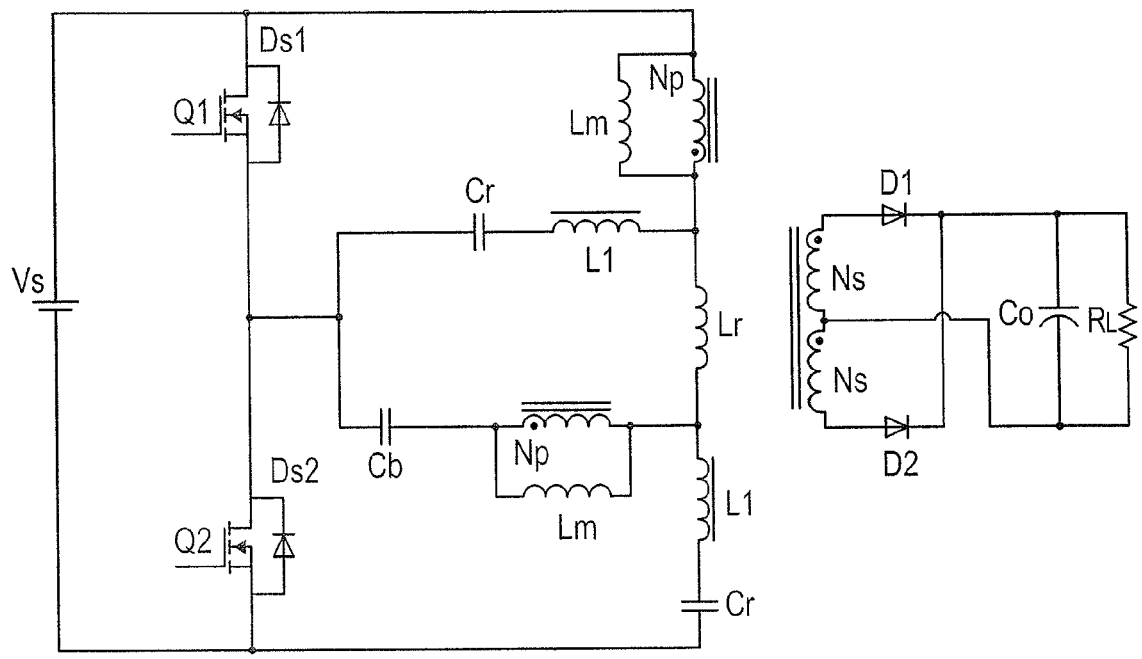
FIG. 18 is a circuit diagram of using the resonant circuit in a power converter in accordance with a third embodiment of the present invention.
Figure 19:
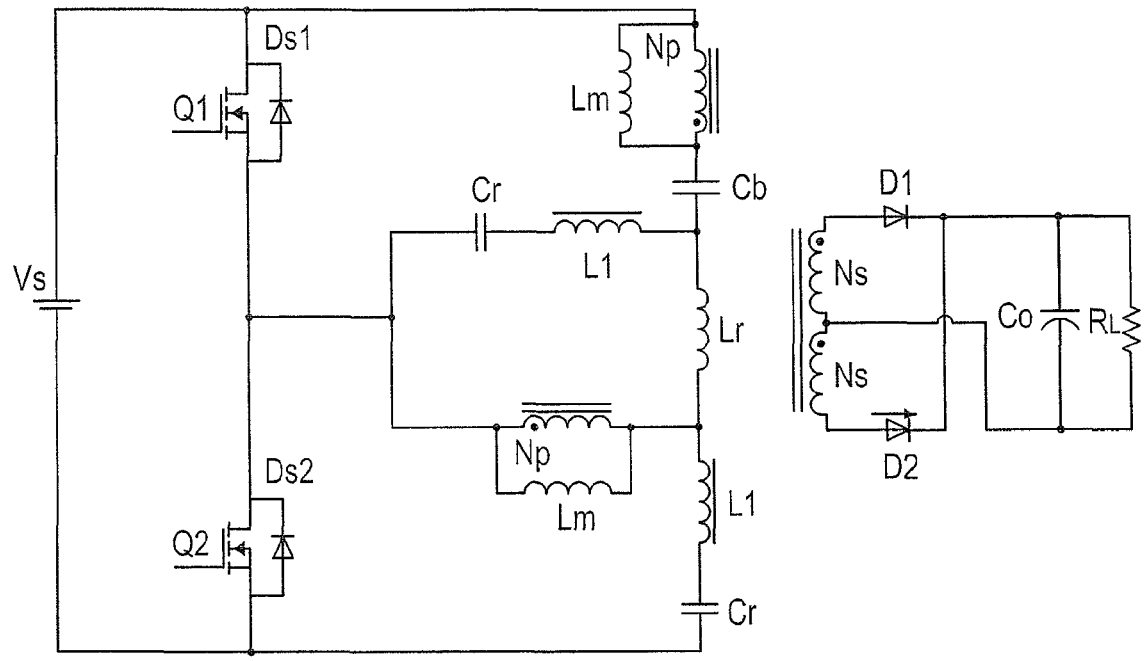
FIG. 19 is a circuit diagram of using the resonant circuit in a power converter in accordance with a fourth embodiment of the present invention.

With reference to FIGS. 18 and 19 for third and fourth embodiments of the power converter, respectively, the DC blocking capacitor Cb and one winding Np on the primary side of the transformer unit 40 are connected in series. At this position, the DC blocking capacitor Cb withstands half the stress from the primary power current.

Figure 20:
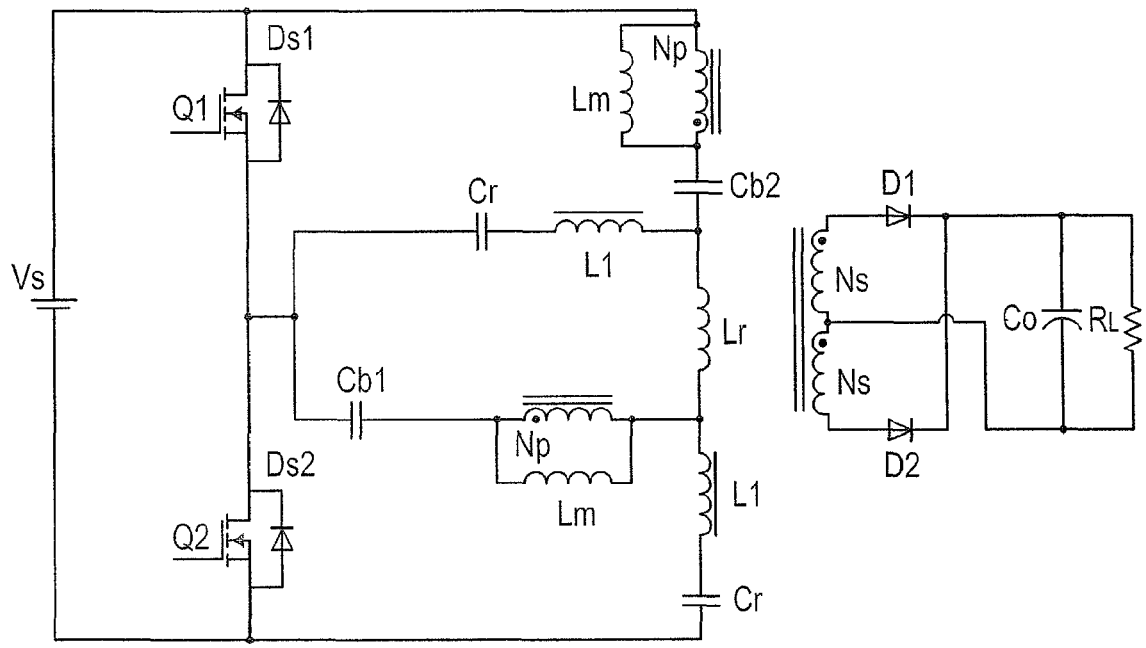
FIG. 20 is a circuit diagram of using the resonant circuit in a power converter in accordance with a fifth embodiment of the present invention.

With reference to FIG. 20 for a fifth embodiment of the power converter, the original DC blocking capacitor Cb is replaced by two capacitors Cb1, Cb2 that are connected in series to the two windings Np on the primary side of the transformer unit 40. The positions of the DC blocking capacitors have been mentioned above and can be their other combinations. In particular, putting the DC blocking capacitor on the branch of the assistant inductor Lr results in the smallest current stress.

Figure 21:
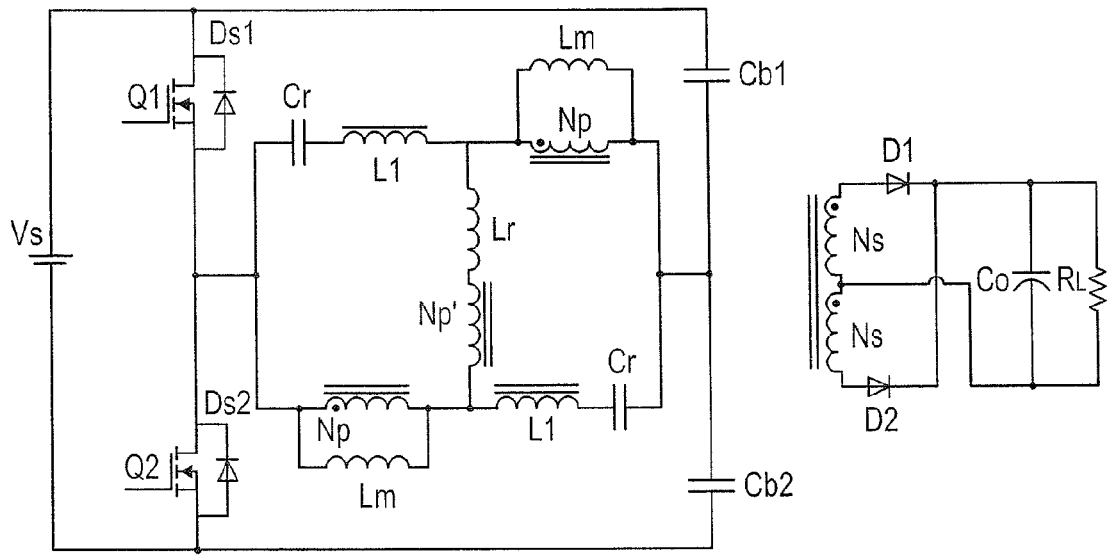
FIG. 21 is a circuit diagram of using the resonant circuit in a power converter in accordance with a sixth embodiment of the present invention.

With reference to FIG. 21 for a sixth embodiment of the power converter, the DC blocking capacitor Cb is replaced by two capacitors Cb1, Cb2. Moreover, the branch of the assistant inductor Lr is connected in series an assistant winding Np' provided by the transformer unit 40. This configuration does not change the circuit operations, but have different system parameters.

Figure 22:
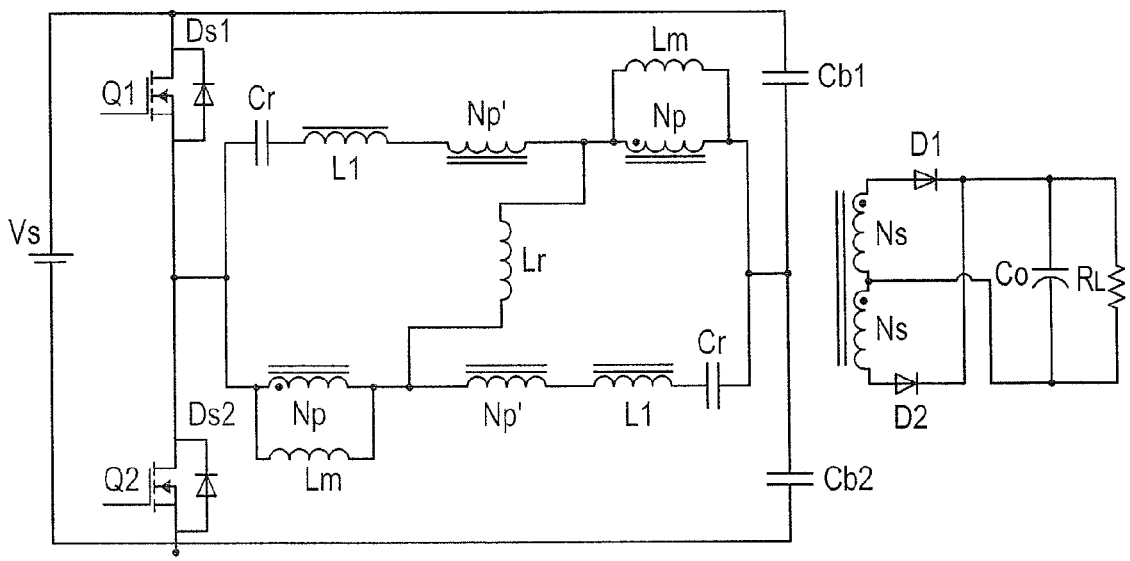
FIG. 22 is a circuit diagram of using the resonant circuit in a power converter in accordance with a seventh embodiment of the present invention.

With reference to FIG. 22 for a seventh embodiment of the power converter, two assistant windings Np' of the transformer unit 40 are connected in series on the two branches of the series inductor L1 and the series capacitor Cr, respectively. This design has an even large influence in the system parameters.

Figure 23:
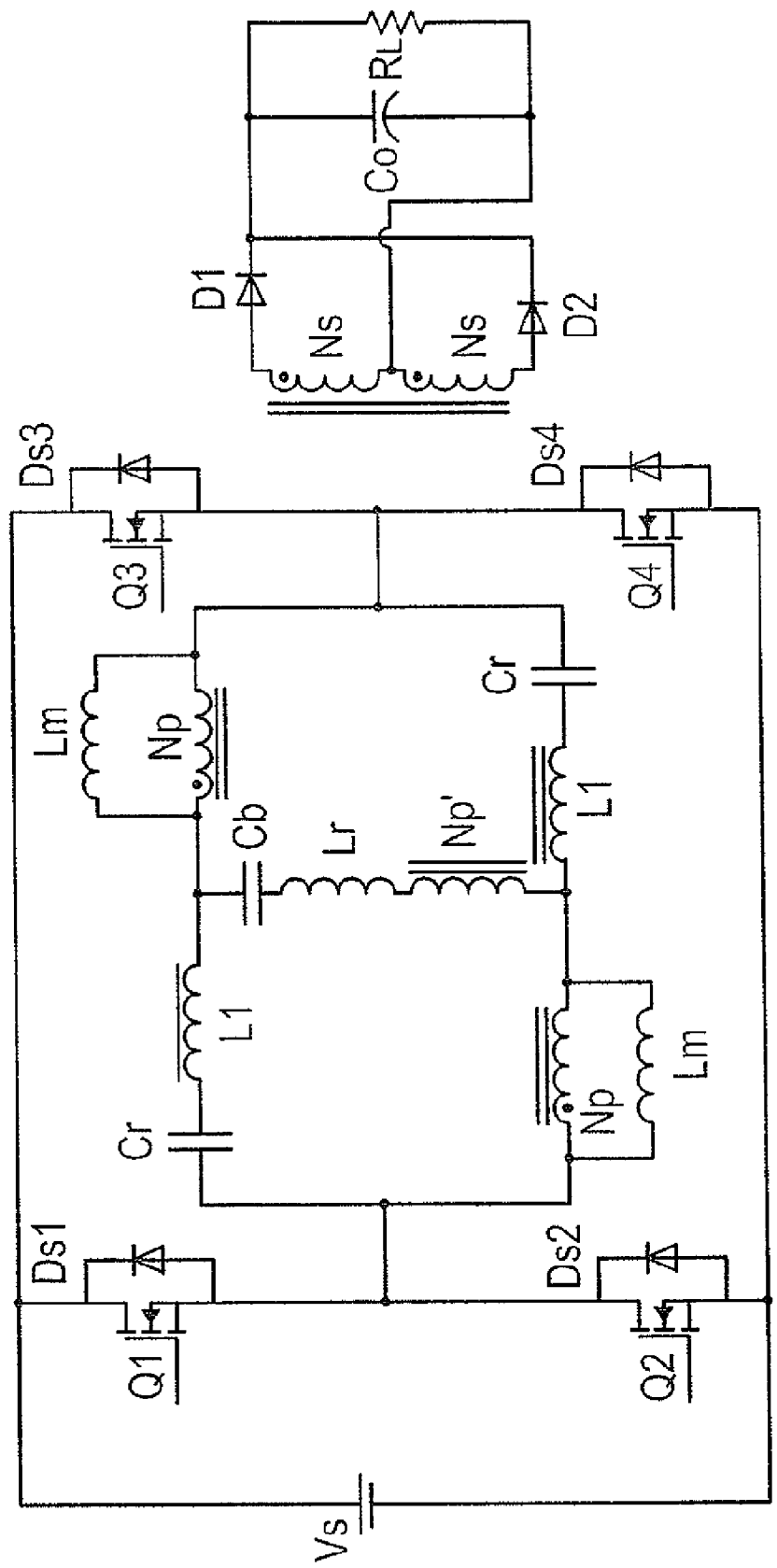
FIG. 23 is a circuit diagram of using the resonant circuit in a power converter in accordance with a eighth embodiment of the present invention.

With reference to FIG. 23, the power converter in this embodiment is based on the design in FIG. 22. The half bridge topology is replaced by a full bridge topology. Therefore, there are four switches Q1~Q4. However, the resonant circuit is not changed at all. The DC blocking capacitor Cb is disposed in the middle to connected with the assistant inductor Lr in series.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A resonant circuit with a narrow operating frequency bandwidth, comprising:
    a first resonant branch and a second resonant branch connected in parallel, each of which comprises:
        a series capacitor; and
        a series inductor connected in series with the series capacitor and having one end for connecting to a primary coil of a transforming unit, the primary coil of the transforming unit being equivalent to a magnetizing inductor in parallel with a winding; and
        an assistant inductor having a first end connected to a connecting node between the series inductor of the first resonant branch and the primary side of the transforming unit; and
        a second end connected to another connecting node between the series inductor of the second resonant branch and the primary side of the transforming unit.

2. The resonant circuit as claimed in claim 1, wherein the transforming unit has two independent transformers and the first resonant branch and the second resonant branch connect to primary coils of the two independent transformers, respectively.

3. The resonant circuit as claimed in claim 1, wherein the transforming unit is a single transformer with two independent primary coils, the two magnetizing inductors are provided by the two primary coils of the transformer, and the first resonant branch and the second resonant branch connect to the two independent primary coils, respectively.

4. The resonant circuit as claimed in claim 1, wherein
    the series capacitor and the series inductor together provide a first characteristic resonant frequency fr; and
    the series capacitor, the series inductor, the magnetizing inductor, and the assistant inductor altogether provide a second characteristic resonant frequency fm.

5. The resonant circuit as claimed in claim 2, wherein
    the series capacitor and the series inductor together provide a first characteristic resonant frequency fr; and
    the series capacitor, the series inductor, the magnetizing inductor, and the assistant inductor altogether provide a second characteristic resonant frequency fm.

6. The resonant circuit as claimed in claim 3, wherein
    the series capacitor and the series inductor together provide a first characteristic resonant frequency fr; and
    the series capacitor, the series inductor, the magnetizing inductor, and the assistant inductor altogether provide a second characteristic resonant frequency fm.

7. The resonant circuit as claimed in claim 1, wherein the primary side of the transforming unit is further connected in parallel with a physical inductor.

8. The resonant circuit as claimed in claim 2, wherein the primary side of the transforming unit is further connected in parallel with a physical inductor.

9. The resonant circuit as claimed in claim 3, wherein the primary side of the transforming unit is further connected in parallel with a physical inductor.

10. A resonant power converter comprising:
    a square wave generator;
    a transforming unit providing a primary side with two primary coils and a secondary side with two secondary coils;
    a resonant circuit connected to the square wave generator and the primary side of the transforming unit and comprising a first resonant branch and a second resonant branch connected in parallel, with an assistant inductor connected between the first resonant branch and the second resonant branch, wherein each of the first resonant branch and the second resonant branch comprises
        a series capacitor; and
        a series inductor connected in series with the series capacitor and having one end being connected to a corresponding primary coil of the transforming unit, each of the primary coils of the transforming unit being equivalent to a magnetizing inductor and a winding connected in parallel; and
    the assistant inductor has
        a first end connected to a connecting node between the series inductor of the first resonant branch and one primary coil of the transforming unit; and
        a second end connected to another connecting node between the series inductor of the second resonant branch and the other primary coil of the transforming unit;
    a rectifying unit connected to the secondary side of the transforming unit and comprising two diodes; and
    a filtering unit connected to the rectifying unit to adapt to connect to a load.

11. The resonant power converter as claimed in claim 10, wherein the transforming unit includes two independent transformers and the first resonant branch and the second resonant branch connect to the primary coils of the two independent transformers, respectively.

12. The resonant power converter as claimed in claim 10, wherein the transforming unit is a single transformer with two independent primary coils, the two magnetizing inductors are provided by the two primary coils of the transformer, and the first resonant branch and the second resonant branch are connected to the two independent primary coils, respectively.

13. The resonant power converter as claimed in claim 10, wherein
    the series capacitor and the series inductor together provide a first characteristic resonant frequency fr; and
    the series capacitor, the series inductor, the magnetizing inductor, and the assistant inductor altogether provide a second characteristic resonance frequency fm; and
    the operating frequency of the resonant power converter being fs satisfies fs>fr or fm<fs<fr.

14. The resonant power converter as claimed in claim 10, wherein the resonant circuit further includes a DC blocking capacitor connected in series with the assistant inductor.

15. The resonant power converter as claimed in claim 10, wherein the resonant circuit further includes a DC blocking capacitor whose one end connects to the square wave generator and whose other end connects to the series inductor of the first resonant branch and the magnetizing inductor of the second resonant branch.

16. The resonant power converter as claimed in claim 10, wherein the resonant circuit further includes a DC blocking capacitor whose one end connects to the square wave generator and the series inductor of the first resonant branch and whose other end connects to the magnetizing inductor of the second resonant branch.

17. The resonant power converter as claimed in claim 10, wherein the resonant circuit further includes a DC blocking capacitor whose one end connects to the magnetizing inductor of one of the resonant branches and whose other end connects to the series inductor and the assistant inductor of said resonant branch.

18. The resonant power converter as claimed in claim 10, wherein the resonant circuit further includes two DC blocking capacitors connected in series with the two primary windings, respectively.

* * * * *